O. SNOW.
Lamp Chimney Holder.

No. 34,908.             Patented April 8, 1862.

Witnesses:             Inventor.

UNITED STATES PATENT OFFICE.

OLIVER SNOW, OF WEST MERIDEN, CONNECTICUT.

IMPROVED SPRING FOR LAMP-CHIMNEYS.

Specification forming part of Letters Patent No. 34,908, dated April 8, 1862.

*To all whom it may concern:*

Be it known that I, OLIVER SNOW, of West Meriden, in the county of New Haven and State of Connecticut, have invented a new and useful Improvement in Lamp-Tops; and I do hereby declare that the following is a full, clear, and exact description of the construction, character, and operation of the same, reference being had to the accompanying drawings, which make part of this specification, in which—

Figure 1:
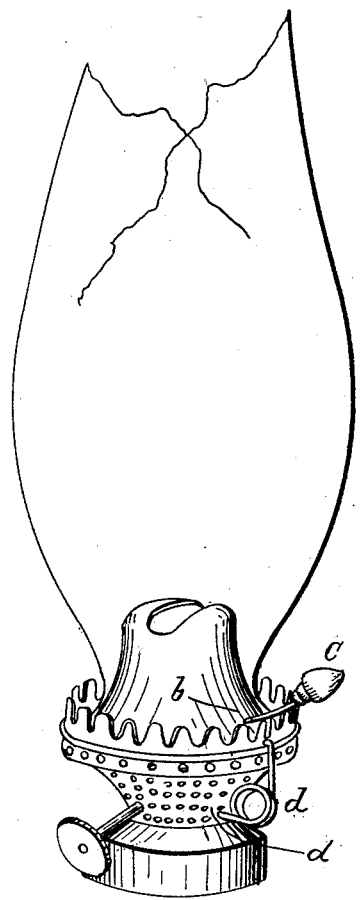
Figure 2:
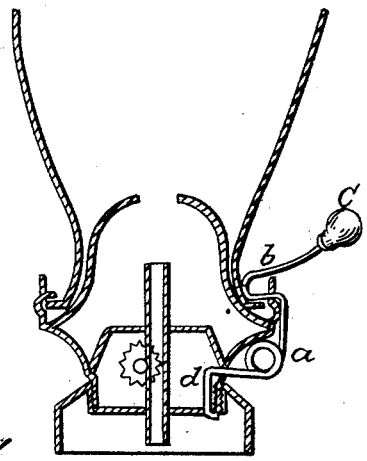

Figure 1 is a perspective view of the lamp-top with the deflector and chimney, showing the form and position of the spring which secures the deflector and chimney in their places. Fig. 2 is a section of the same cut vertically through the center, showing the relative position of the parts and the manner of securing the spring.

My improvement consists in so constructing and attaching a coiled-wire spring to the upper part of the lamp-top that any length (even the shortest) of lamp-top may be used, and so that the whole of the operating part of the spring is outside, so that it is not liable to have its elasticity destroyed gradually by the heat of the lamp, as is the case with that patented by E. F. Jones, and so that the spring, being on the outside, is not in the way of a feeding-tube, as described in my application now pending, or any other internal arrangement.

I make the lamp-top of sheet metal or any other suitable material in the form represented in Fig. 1, or of any other form or construction suitable for using a deflector and glass chimney.

I make the spring of steel or any other suitable wire of the wound or coiled form, either helical, as represented at $a$, Fig. 1, or spiral; and I bend the upper portion into a suitable shape to rest upon and secure the chimney, as indicated at $b$, Figs. 1 and 2, with a suitable knob or turn on the end, as shown at $c$, Figs. 1 and 2, by which the spring may be drawn back to release the chimney, the securing portion being guided by two points of the crown, between which they rest.

I attach this spring to the upper part of the lamp-top by passing its lower end through the side and bottom, as shown at $d$, Fig. 2, and secure its end with solder or by any other suitable means to hold it firm.

The advantages of my improvement consist in that the spring may be made of any desired degree of strength, and yet in all cases work with ease and pliability, as it may be coiled of any number of turns desired, and in that, whatever strength or extent of motion may be desired, it can be used with the very shortest or least elevated tops as conveniently as with those of the long and unsymmetrical proportions, which are required to receive the spring as patented by E. F. Jones, May 4, 1858, and in that the whole of the elastic or operating part of the spring is on the outside, where its elasticity is not liable to be gradually destroyed by the heat of the lamp, as is the case where Jones' springs are used, and in that the spring working on the outside will not be in the way of a feeding-tube, as described in my application now pending, or any other internal arrangement which may be desired.

I am aware that flat or sheet metal springs have been used for securing glass chimneys upon lamp-tops, where they are attached to the wick-tube, as shown in E. F. Jones' patent, or to the deflector, as shown in O. & H. S. Snow's patent, or to the crown or rim of the lamp-top, as in I. W. Taber's application, (rejected March 23, 1861;) and that a helical spring has been used to shoot a rod or point by direct action to secure the chimney. I therefore do not claim, but disclaim these; but—

What I claim as my invention, and desire to secure by Letters Patent, is—

The use of a coiled-wire spring in combination with the upper part of the lamp-top to secure the chimney in its place when they are constructed, attached, and fitted to produce the effect substantially as herein described.

OLIVER SNOW.

Witnesses:
S. THOMPSON,
R. FITZGERALD.